United States Patent
Zhang et al.

(10) Patent No.: US 10,530,457 B1
(45) Date of Patent: *Jan. 7, 2020

(54) BEAMSTEERING IN A SPATIAL DIVISION MULTIPLE ACCESS (SDMA) SYSTEM

(71) Applicant: MARVELL INTERNATIONAL LTD., Hamilton (BM)

(72) Inventors: Hongyuan Zhang, Fremont, CA (US); Sudhir Srinivasa, Campbell, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 49 days.

This patent is subject to a terminal disclaimer.

(21) Appl. No.: 15/131,536

(22) Filed: Apr. 18, 2016

Related U.S. Application Data

(63) Continuation of application No. 14/188,363, filed on Feb. 24, 2014, now Pat. No. 9,319,122, which is a continuation of application No. 12/855,521, filed on Aug. 12, 2010, now Pat. No. 8,660,497.

(60) Provisional application No. 61/234,925, filed on Aug. 18, 2009.

(51) Int. Cl.
  *H04B 7/08* (2006.01)
  *H04B 7/06* (2006.01)

(52) U.S. Cl.
  CPC ......... *H04B 7/0897* (2013.01); *H04B 7/0613* (2013.01)

(58) Field of Classification Search
  CPC .................................................. H04B 7/0897
  USPC ......................................... 370/342
  See application file for complete search history.

(56) References Cited

U.S. PATENT DOCUMENTS

| | | |
|---|---|---|
| 6,862,440 B2 | 3/2005 | Sampath |
| 7,039,442 B1 | 5/2006 | Joham et al. |
| 7,206,354 B2 | 4/2007 | Wallace et al. |
| 7,486,740 B2 | 2/2009 | Inanoglu |
| 7,599,332 B2 | 10/2009 | Zelst et al. |

(Continued)

FOREIGN PATENT DOCUMENTS

| | | |
|---|---|---|
| EP | 2106038 A1 | 9/2009 |
| WO | WO-2005/081483 A1 | 9/2005 |

OTHER PUBLICATIONS

Huh et al., "Network MIMO with Linear Zero-Forcing Beamforming: Large System Analysis, Impact of Channel Estimation and Reduced-Complexity Scheduling," *IEEE Trans. on Inform. Theory*, 54 pages (Sep. 12, 2011).

(Continued)

*Primary Examiner* — Brandon M Renner
*Assistant Examiner* — Abdeltif Ajid

(57) ABSTRACT

In a communication network, a first communication device obtains respective channel estimate matrices of respective communication channels between i) the first communication device and ii) respective second communication devices. The first communication device generates respective steering matrices for use in communicating with the respective second communication devices, including generating each steering matrix to project to a null-space of a space spanned by channel estimate matrices corresponding to others of the second communication devices. The first communication device utilizes the respective steering matrices to simultaneously transmit respective signals to the respective second communication devices.

18 Claims, 5 Drawing Sheets

(56) References Cited

U.S. PATENT DOCUMENTS

| | | | |
|---|---|---|---|
| 7,729,439 | B2 | 6/2010 | Zhang et al. |
| 7,742,390 | B2 | 6/2010 | Mujtaba |
| 7,917,107 | B2 | 3/2011 | Gu et al. |
| 8,270,909 | B2 | 9/2012 | Zhang et al. |
| 8,289,869 | B2 | 10/2012 | Sawai |
| 8,619,907 | B2 | 12/2013 | Mujtaba et al. |
| 8,660,497 | B1 | 2/2014 | Zhang et al. |
| 9,319,122 | B1 | 4/2016 | Zhang et al. |
| 2003/0153316 | A1 | 8/2003 | Noll et al. |
| 2004/0066754 | A1 | 4/2004 | Hottinen |
| 2005/0138199 | A1* | 6/2005 | Li ............ H04W 74/0891 709/236 |
| 2005/0152299 | A1 | 7/2005 | Stephens |
| 2005/0157805 | A1 | 7/2005 | Walton et al. |
| 2005/0195733 | A1 | 9/2005 | Walton et al. |
| 2006/0063492 | A1 | 3/2006 | Iacono et al. |
| 2007/0086400 | A1 | 4/2007 | Shida et al. |
| 2007/0142089 | A1 | 6/2007 | Roy |
| 2007/0155336 | A1* | 7/2007 | Nam ............ H04B 7/0408 455/69 |
| 2007/0201566 | A1 | 8/2007 | Solomon et al. |
| 2007/0293214 | A1 | 12/2007 | Ansari et al. |
| 2007/0298742 | A1 | 12/2007 | Ketchum et al. |
| 2008/0075058 | A1* | 3/2008 | Mundarath ......... H04B 7/043 370/342 |
| 2008/0076370 | A1 | 3/2008 | Kotecha et al. |
| 2008/0187032 | A1 | 8/2008 | Pande et al. |
| 2008/0247370 | A1 | 10/2008 | Gu et al. |
| 2009/0046009 | A1* | 2/2009 | Fujii ............ H04B 7/0417 342/373 |
| 2009/0196163 | A1 | 8/2009 | Du |
| 2009/0245153 | A1 | 10/2009 | Li et al. |
| 2009/0274226 | A1 | 11/2009 | Mondal et al. |
| 2009/0296650 | A1 | 12/2009 | Venturino et al. |
| 2010/0041406 | A1 | 2/2010 | Kim et al. |
| 2010/0046656 | A1 | 2/2010 | van Nee et al. |
| 2010/0246702 | A1 | 9/2010 | Miyoshi |
| 2011/0199946 | A1 | 8/2011 | Breit et al. |
| 2011/0305205 | A1 | 12/2011 | Gong et al. |
| 2011/0310827 | A1 | 12/2011 | Srinivasa et al. |
| 2012/0039196 | A1 | 2/2012 | Zhang |

OTHER PUBLICATIONS

Wiesel et al., "Zero-Forcing Precoding and Generalized Inverses," *IEEE Transactions on Signal Processing*, vol. 56, No. 9, pp. 4409-4418 (Sep. 2008).

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Ansari, et al., "Unified MIMO Pre-Coding Based on Givens Rotation," the Institute of Electrical and Electronics Engineers, doc. No. IEEE C802.16e-04/516r2, pp. 1-13, (Jan. 11, 2005).

Chen, "Home Network Basis: Transmission Environments and Wired/Wireless Protocols," Prentice Hall, pp. 1-26 (Jul. 2003).

Gunnam et al., "Multi-Rate Layered Decoder Architecture for Block LDPC Codes of the IEEE.802.11n Wireless Standard," IEEE International Symposium on Circuits and Systems, 2007 (ISCAS 2007), pp. 1645-1648 (2007).

Hiertz et al., "The IEEE 802.11 Universe," IEEE Communications Magazine, pp. 62-70, (Jan. 2010).

IEEE Std 802.Nov. 2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," the Institute of Electrical and Electronics Engineers, Inc., (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003.

lmashioya et al., "RTL Design of 1.2 Gbps MIMO WLAN System and Its Business Aspect," IEEE 9th Intl. Symposium on Communications and Information Technology (ISCIT 2009), The Institute of Electrical and Electronics Engineers, pp. 296-301 (2009).

Love et al., "An Overview of Limited Feedback in Wireless Communication Systems," IEEE J. on Selected Areas in Communications, vo. 26, No. 8, pp. 1341-1365 (Oct. 2008).

Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.

Shi et al., "Phase Tracking During VHT-LTF," Doc. No. IEEE 802.11-10/07711-0, The Institute of Electrical and Electronics Engineers, Inc., Jul. 2010.

Syafei et al., "A Design of Next Generation Gigabit MIMO Wireless LAN System ," IEEE 12th Intl. Conference on Advanced Communication Technology (ICACT 2010), The Institute of Electrical and Electronics Engineers, pp. 941-946 (2010).

Syafei et al., "A Gigabit MIMO WLAN System with International Standardization Strategy," IEEE Intl. Symposium on Intelligent Signal Processing and Communication Systems (ISPACS 2009), The Institute of Electrical and Electronics Engineers, pp. 228-231 (2009).

Syafei et al., "Design of 1.2 Gbps MIMO WLAN System for 4K Digital Cinema Transmission," IEEE 20.sup.th Intl Symposium on Personal, Indoor and Mobile Radio Communications (PIMRC 2009), The Institute of Electrical and Electronics Engineers, pp. 207-211 (2009).

Van Nee et al., "The 802.11 n. MIMO-OFDM Standard for Wireless LAN and Beyond," Wireless Personal Communications, vol. 37, pp. 445-453 (Jun. 2006).

Van Zelst et al., "Pilot Sequence for VHT-DATA," Doc. No. IEEE 802.11-10/0811 r1, The Institute of Electrical and Electronics Engineers, Inc., Jul. 2010.

Zhang et al., "11 ac Explicit Sounding and Feedback", The Institute of Electrical and Electronics Engineers, doc. No. IEEE 802.11-10/1105r0, 44 pages (Sep. 2010).

Zhang et al., "Applying Antenna Selection in WLANs for Achieving Broadband Multimedia Communications," IEEE Trans. on Broadcasting, vol. 52, No. 4, pp. 475-482 (Dec. 2006).

(56) References Cited

OTHER PUBLICATIONS

Zhang et al., "Asynchronous Interference Mitigation in Cooperative Base Station Systems," IEEE Trans. on Wireless Communications, vol. 7, No. 1, Jan. 2008.

* cited by examiner

US 10,530,457 B1

BEAMSTEERING IN A SPATIAL DIVISION MULTIPLE ACCESS (SDMA) SYSTEM

CROSS-REFERENCES TO RELATED APPLICATIONS

This application is a continuation of U.S. patent application Ser. No. 14/188,363, now U.S. Pat. No. 9,319,122, entitled "Beamsteering in a Spatial Division Multiple Access (SDMA) System," filed Feb. 24, 2014, which is a continuation of U.S. patent application Ser. No. 12/855,521, now U.S. Pat. No. 8,660,497, entitled "Beamsteering in a Spatial Division Multiple Access (SDMA) System," filed Aug. 12, 2010, which claims the benefit of the U.S. Provisional Patent Application No. 61/234,925, entitled "DL-SDMA Steering Algorithms," filed on Aug. 18, 2009. The applications referenced above are hereby incorporated by reference herein in their entireties.

FIELD OF THE DISCLOSURE

The present disclosure relates generally to communication networks and, more particularly, to wireless networks that utilize spatial division multiple access (SDMA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps.

WLANs typically operate in either a unicast mode or a multicast mode. In the unicast mode, an access point (AP) transmits information to one client station at a time. In the multicast mode, the same information is transmitted to a group of client stations concurrently.

Antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

SUMMARY

In an embodiment, a method obtaining, at a first communication device, respective channel estimate matrices of respective communication channels between i) the first communication device and ii) respective second communication devices. The method also includes generating, at the first communication device, respective steering matrices for use in communicating with the respective second communication devices, wherein generating each respective steering matrix for use in communicating with each respective second communication device comprises generating the steering matrix to project to a null-space of a space spanned by channel estimate matrices corresponding to others of the second communication devices. Additionally, the method includes utilizing, at the first communication device, the respective steering matrices to simultaneously transmit respective signals to the respective second communication devices.

In another embodiment, a first communication device comprises one or more integrated circuit devices configured to obtain respective channel estimate matrices of respective communication channels between i) the first communication device and ii) respective second communication devices, generate respective steering matrices for use in communicating with the respective second communication devices, wherein generating each respective steering matrix for use in communicating with each respective second communication device comprises generating the steering matrix to project to a null-space of a space spanned by channel estimate matrices corresponding to others of the second communication devices. Also, the one or more integrated circuit devices are configured to utilize the respective steering matrices to process respective signals to be transmitted simultaneously to the respective second communication devices.

In yet another embodiment, a method in an access point (AP) is for generating a first steering matrix and a second steering matrix to be used for simultaneous transmission of first data to a first station and second data to a second station, respectively. The method includes receiving, at the AP, a first signal from the first station, wherein the first signal includes an indication of a first null-steering matrix corresponding to a null-space projection of a first communication channel between the AP and the first station, and receiving, at the AP, a second signal from the second station, wherein the second signal includes an indication of a second null-steering matrix corresponding to a null-space projection of a second communication channel between the AP and the second station. Additionally, the method includes generating the first steering matrix using the indication of the second null-steering matrix, and generating the second steering matrix using the indication of the first null-steering matrix.

In still another embodiment, an AP comprises one or more integrated circuit devices configured to receive an indication of a first null-steering matrix corresponding to a null-space projection of a first communication channel between the AP and a first station, receive an indication of a second null-steering matrix corresponding to a null-space projection of a second communication channel between the AP and a second station, generate a first steering matrix using the indication of the second null-steering matrix, the first steering matrix for use in transmitting to the first station, and generate a second steering matrix using the indication of the first null-steering matrix, the second steering matrix for use in transmitting to the second station.

DETAILED DESCRIPTION

In embodiments described below, a wireless network device such as an access point (AP) of a wireless local area network (WLAN) transmits independent data streams to multiple client stations simultaneously via an antenna array. To reduce interference at a receiving station due to transmissions from the AP to one or more other stations, the AP develops respective transmit (Tx) beamsteering (hereinafter, "steering") vectors for downlink transmissions to each station. In an embodiment, the AP develops a Tx steering vector for a certain station using a description of the wireless communication channel between the AP and the station, as well a description of at least one other wireless communication channel between the AP and another station. In another embodiment, the AP uses the description of the wireless channel between the AP and a certain station to develop a Tx steering vector for the station, but does not use descriptions of wireless communication channels between the AP and other stations. In other words, according to this embodiment, the AP develops independent Tx steering vectors for the stations.

In some embodiments, an AP obtains a description of several wireless communication channels (hereinafter, "channel descriptions") through which the AP transmits data to corresponding stations. As discussed below, depending on the embodiment, the AP uses the channel descriptions to generate Tx steering vectors so as to (i) cancel known interference at each station as well as interference between space-time streams at each station, (ii) minimize receiver input mean square error (MSE) at each station, (iii) minimize "leakage" of a signal transmitted to one of the stations to the other stations, and/or (iv) cancel known interference among each of the several stations without necessarily canceling interference between different spatial streams of each station. In at least some of these embodiments, the AP develops multiple Tx steering vectors corresponding to different stations at the same time. In another embodiment, the AP generates a Tx steering vector for a certain station using the channel descriptor corresponding to the communication channel between the AP and the station with no regard to channel descriptors corresponding to other communication channels.

Figure 1:
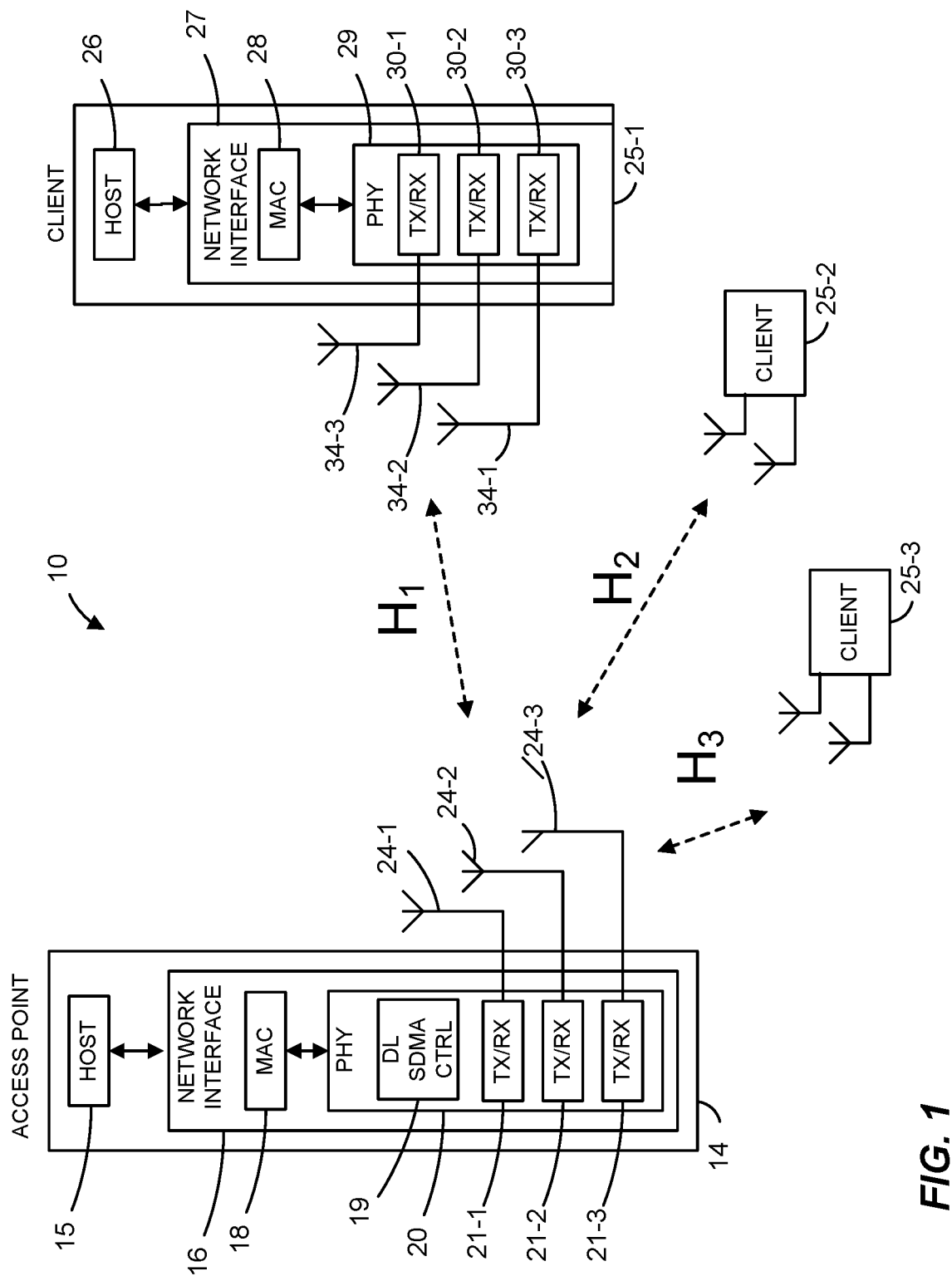
FIG. 1 a block diagram of an example wireless local area network (WLAN) in which an access point (AP) utilizes downlink (DL) Spatial-Division Multiple Access (SDMA) beamsteering techniques in accordance with an embodiment of the present disclosure.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes $N_T$ transceivers 21, and the transceivers are coupled to $N_T$ antennas 24. Although three transceivers 21 and three antennas 24 are illustrated in FIG. 1 (i.e., $N_T$=3), the AP 14 can include different numbers (e.g., $N_T$=2, 4, 5, etc.) of transceivers 21 and antennas 24 in other embodiments. The PHY unit 20 also includes a downlink (DL) Spatial-Division Multiple Access (SDMA) controller 19 that implements one or several of the techniques for developing steering vectors described herein.

The WLAN 10 includes K client stations 25, each station 25-$i$ equipped with $N_i$ antennas. Although three client stations 25 are illustrated in FIG. 1 (i.e., K=3), the WLAN 10 can include different numbers (e.g., K=2, 4, 5, 6, etc.) of client stations 25 in various scenarios and embodiments. Two or more of the client stations 25 are configured to receive corresponding data streams having been simultaneously transmitted from the AP 14 so that the AP 14.

A client station 25-1 includes a host processor 26 coupled to a network interface 27. The network interface 27 includes a MAC unit 28 and a PHY unit 29. The PHY unit 29 includes $N_1$ transceivers 30, and the $N_1$ transceivers 30 are coupled to $N_1$ antennas 34. Although three transceivers 30 and three antennas 34 are illustrated in FIG. 1 (i.e., $N_1$=3), the client station 25-1 can include different numbers of transceivers 30 and antennas 34 (e.g., $N_1$=1, 2, 4, 5, etc.) in other embodiments. The client stations 25-2 and 25-3 have a structure that is the same as or generally similar to the client station 25-1. In an embodiment, each of the client stations 25-2 and 25-3 is structured like the client station 25-1 but has only two transceivers and two antennas (i.e., $N_2$=$N_3$=2). In other embodiments, the client stations 25-2, and 25-3 can include different numbers of antennas (e.g., 1, 3, 4, 5, etc.).

In an embodiment, the AP 14 is configured to transmit multiple spatial streams to the client stations 25-1, 25-2, and 25-3, so that each of client stations 25-$i$ receives data via $L_i$ spatial streams. For example, the client station 25-1 receives data via three (i.e., $L_1$=3) spatial streams. Although in this example $L_1$=$N_1$, a client station 25-$i$ in general can utilize fewer spatial stream than the number of antennas with which the client station 25-$i$ is equipped. Further, when space-time coding is employed, the multiple spatial streams are sometimes referred to by those of ordinary skill in the art as space-time streams. If the number of space-time streams is less than the number of transmit chains, spatial mapping is employed, in some embodiments.

In an embodiment, the AP 14 communicates with the client station 25-1 over a multiple input, multiple output (MIMO) channel defined, at the one end, by the array including the antennas 24-1, 24-2, and 24-3 and, at the other end, by the array including the antennas 34-1, 34-2, and 34-3. The MIMO channel can be described by a three-by-three channel matrix $H_1$ that specifies, in each element, a channel gain parameter for a stream defined by the corresponding transmit antenna and a receive antenna. Similarly, the AP communicates with the clients 25-2 and 25-3 via MIMO channels described by matrices $H_2$ and $H_3$, respectively. In at least some embodiments, the dimensionality of a matrix $H_i$ describing a MIMO channel between the AP 14 and a client station 25-$i$ is $N_i \times N_T$.

During operation, the AP 14 transmits a symbol to a client station 25-$i$ as a transmit symbol vector $x_i$ of dimensionality $L_i \times 1$, and the client station 25-$i$ receives a signal that can be represented as a vector $y_i$ of dimensionality $N_i \times 1$. In an embodiment, the AP 14 applies a respective steering vector $W_i$ of dimensionality $N_T \times L_i$ to the transmit symbol vector $x_i$ prior to transmitting the signal via the corresponding channel $H_i$. Thus, when the AP 14 simultaneously transmits data to stations 25-1, 25-2, . . . 25-K, the signal received at the client station 25-$i$ can be expressed as $$y_i = \underbrace{H_i W_i x_i}_{intended} + \underbrace{H_i \sum_{k \neq i} W_k x_k}_{interference} + \underbrace{n_i}_{noise} \quad \text{(Eq. 1)}$$

As illustrated by Eq. 1, the received signal includes an intended component, an interference component due to signals intended for other client stations, and a noise component (expressed as a vector $n_i$ of dimensionality $N_i \times 1$). Eq. 1 also can be written as $$y_i = H_i W_i x_i + H_i \sum_{k \neq i} W_k x_k + n_i = \quad \text{(Eq. 2)}$$

$$H_i [W_1 \quad W_2 \quad \ldots \quad W_K] \begin{bmatrix} x_1 \\ x_2 \\ \vdots \\ x_K \end{bmatrix} + n_i == H_i W x + n_i, \, i = 1 \ldots K$$

where $$W = [W_1 \quad W_2 \quad \ldots \quad W_K], x = \begin{bmatrix} x_1 \\ x_2 \\ \vdots \\ x_K \end{bmatrix}$$

Further, the signals $y_1, y_2, \ldots y_K$ can be "stacked" together to define an aggregate receive vector $y$:

$$y = \begin{bmatrix} y_1 \\ y_2 \\ \vdots \\ y_K \end{bmatrix} = H_T W \begin{bmatrix} x_1 \\ x_2 \\ \vdots \\ x_K \end{bmatrix} + \begin{bmatrix} n_1 \\ n_2 \\ \vdots \\ n_K \end{bmatrix} = H_W x + n \quad \text{(Eq. 3)}$$

where $$H_T = \begin{bmatrix} H_1 \\ H_2 \\ \vdots \\ H_K \end{bmatrix}, H_W = \begin{bmatrix} H_1 W_1 & H_1 W_2 & \cdots & H_1 W_K \\ H_2 W_1 & H_2 W_2 & \cdots & H_2 W_K \\ \vdots & \vdots & \vdots & \vdots \\ H_K W_1 & H_K W_2 & \cdots & H_K W_K \end{bmatrix}, \text{and } n = \begin{bmatrix} n_1 \\ n_2 \\ \vdots \\ n_K \end{bmatrix}.$$

To improve the overall throughput of the WLAN 10, it is desirable to reduce the interference components as much as possible for as many stations as possible, preferably without attenuating the intended components. To this end, in other embodiments, the DL SDMA controller 19 develops the aggregate steering matrix W (that includes the individual vectors $W_i$, $W_2$, . . . $W_K$) so as to achieve a configuration optimal for the overall group of K client stations 25. However, in other embodiments, the DL SDMA controller 19 develops vectors $W_i$ individually (e.g., sequentially).

Figure 2:
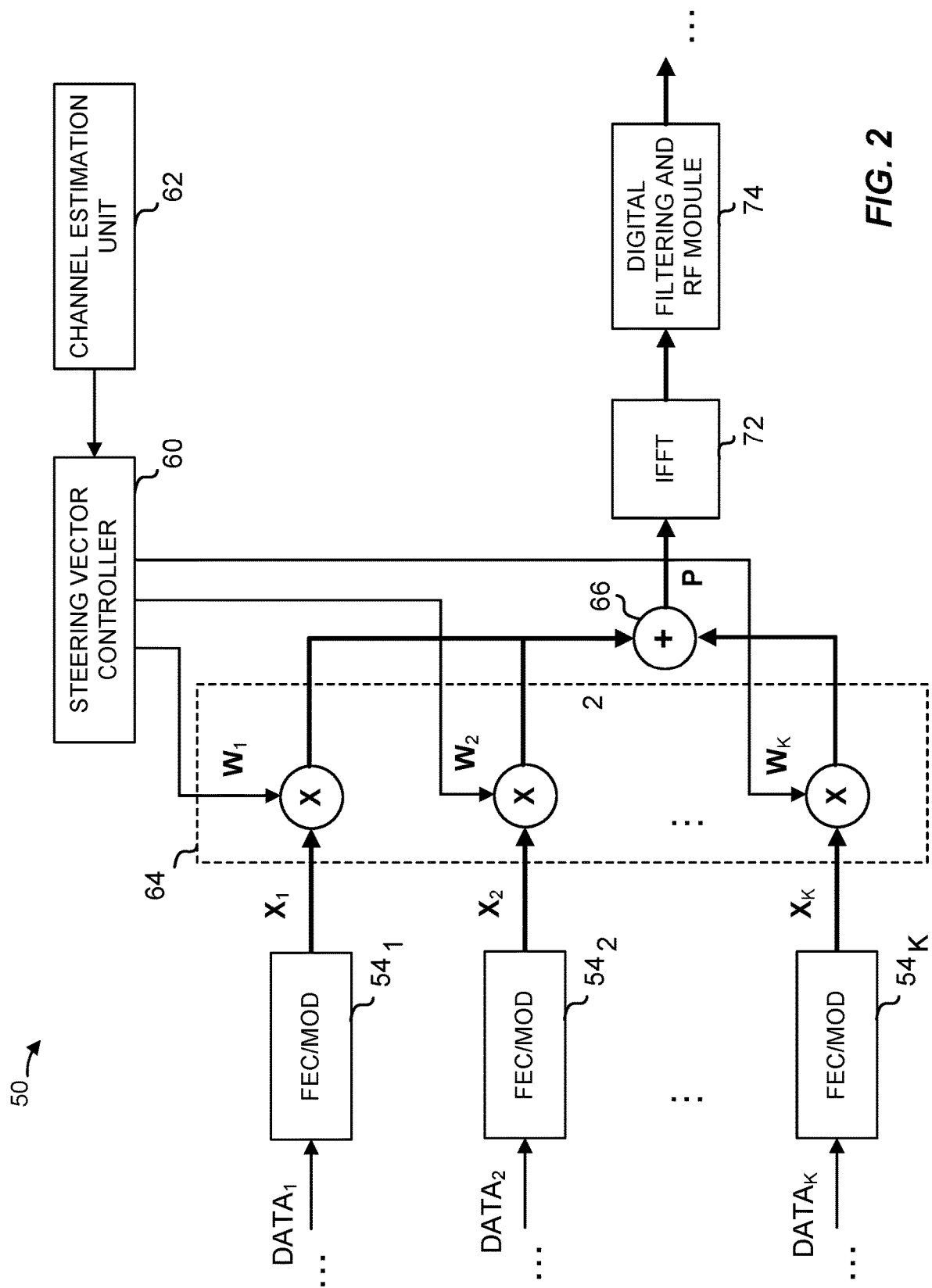
FIG. 2 is a block diagram of a DL SDMA controller that is used in an AP that implements beamsteering techniques of the present disclosure, according to an embodiment.

Referring to FIG. 2, a DL SDMA controller 50 operates as the DL SDMA controller 19, according to an embodiment. The DL SDMA controller 50 receives a plurality data streams $DATA_1$, $DATA_2$, . . . $DATA_K$ to be simultaneously transmitted to respective client stations. Depending on the embodiment, the data streams $DATA_1$, $DATA_2$, . . . $DATA_K$ include packets, frames, or other data units. A set of K forward error correction (FEC) and modulation units 54 processes the data streams $DATA_1$, $DATA_2$, . . . $DATA_K$ to generate transmit symbol vectors $x_i$, $x_2$, . . . $x_K$. A spatial steering unit 64 then applies a respective steering vector $W_i$ to each transmit symbol vector $x_i$. In an embodiment, an adder 66 combines the resulting product vectors into an aggregate product vector.

In an embodiment, a steering vector controller 60 receives channel descriptions from a channel estimation unit 62 to develop steering vectors $W_i$, $W_2$, . . . $W_K$ that are supplied to the spatial steering unit 64. According to an embodiment, each channel description includes channel gain parameters (which may be complex numbers) for various streams defined by transmit and receive antennas. As discussed above, a channel description in some embodiments is represented in a matrix format. In some embodiments, the channel estimation unit 62 performs measurement of one or several parameters associated with the physical channel to develop channel state information (CSI) or another metric. In another embodiment, the channel estimation unit 62 receives CSI feedback information for various channels from stations associated with these channels. In general, the channel estimation unit 62 can implement any suitable technique for developing channel descriptions, including those currently known to those of ordinary skill in the art.

Applying the techniques described herein, the steering vector controller 60 in an embodiment generates a steering vectors $W_i$ (for transmitting data to a receiver such as a station i via a corresponding communication channel described by a matrix $H_i$) in view of both the channel described by a matrix $H_i$ and at least one other channel (described by a matrix $H_j$, for example). In an embodiment, the steering vector controller 60 generates the steering vectors $W_i$, $W_2$, . . . $W_K$ concurrently in view of the channel descriptors $H_1$, $H_2$, . . . $H_K$ to minimize (or, at least, attempt to minimize) interference at each station. Several example algorithms that the steering vector controller 60 implements to minimize interference at one or more stations, according to some embodiments, are discussed with reference with FIGS. 3A-E.

With continued reference to FIG. 2, the output of the adder 66 (e.g., an aggregate product vector P) is supplied to an inverse discrete Fourier transform module (e.g., an inverse fast Fourier transform (IFFT) module) 72, according to an embodiment. The IFFT module 72 in turn is coupled to a digital filtering and RF module 74. Once processed by the IFFT module 72 and the digital filtering and RF module 74, the data corresponding to the aggregate product vector is transmitted via an antenna array. As indicated above, an efficient set of steering vectors $W_i$, $W_2$, . . . $W_K$ results in a transmission pattern such that the intended components of the transmitted signals are transmitted to the corresponding receiving stations, while the interference components at each station are minimized, e.g., reduced to zero or nearly zero.

Prior to discussing several example techniques for generating a set of steering vectors $W_i$, $W_2$, ... $W_K$ in view of multiple channel descriptors, an approach to developing a certain steering vector $W_i$ (to be used for transmitting data over a channel described by a channel descriptor $H_i$) based on the channel descriptor $H_i$ but not on other channel descriptors is considered next.

Figure 3A:
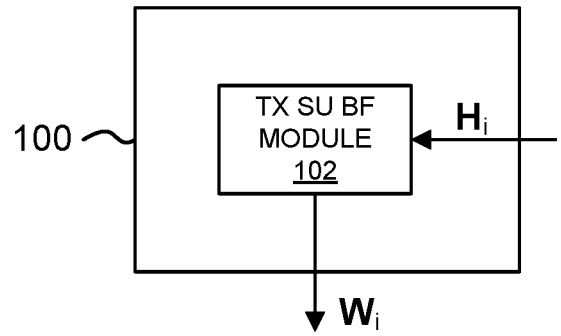
FIG. 3A is a block diagram of a steering vector controller that generates beamsteering vectors using a single-user beamforming (SU-BF) technique, used in a DL SDMA controller according to an embodiment.

Referring to FIG. 3A, a steering vector controller 100 includes a transmit single user beamforming (Tx SU-BF) module 102. The Tx SU-BF module 102 receives a channel descriptor $H_i$ and develops a Tx steering vector $W_i$ without considering interference at other client stations. In an embodiment, the Tx SU-BF module 102 implements a singular value decomposition (SVD) technique to generate a steering vector $W_i$ for a multi-stream wireless communication channel described by the channel descriptor $H_i$:

$$W_i = \text{SVD}(H_i) \quad \text{(Eq. 4)}$$

In another embodiment or another mode of operation, the SU-BF module 102 generates a steering vector $W_j$ for a single-stream wireless communication channel described by a channel descriptor $H_j$:

$$W_j = \text{Cophase}(H_j) \quad \text{(Eq. 5)}$$

In an embodiment, the SU-BF module 102 iteratively develops steering vectors $W_i$, $W_2$, ... $W_K$ for use with communication channels described by channel descriptors $H_1$, $H_2$, ... $H_K$ (corresponding to stations with indexes 1, 2, ... K, respectively). It is noted that in at least some situations, the technique discussed with reference to FIG. 3A results in significant co-channel interference (CCI) between stations if multiple streams are used for each station. On the other hand, if a single stream is used for each user, the stations experience relatively small CCI.

Figure 3B:
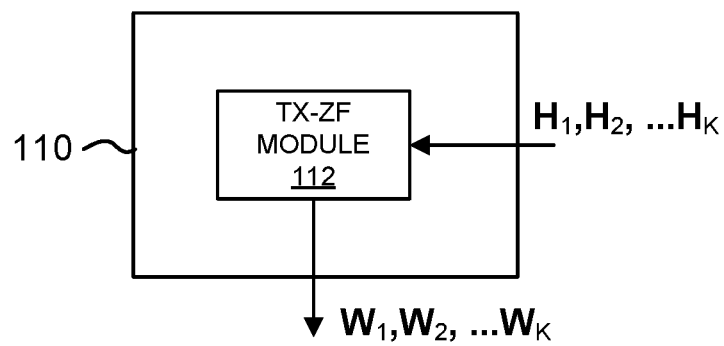
FIG. 3B is a block diagram of a steering vector controller that generates beamsteering vectors using a zero-forcing (ZF) technique, used in a DL SDMA controller according to an embodiment.

Referring to FIG. 3B, a steering vector controller 110 includes a transmit zero-forcing (Tx-ZF) module 112. The Tx-ZF module 112 receives channel descriptors $H_1$, $H_2$, ... $H_K$ and outputs corresponding steering vectors $W_1$, $W_2$, ... $W_K$. In an embodiment, the Tx-ZF module 112 designs each steering vector $\{W_i\}_{j=1 \ldots K}$ so that $$H_W = H_T W = I \quad \text{(Eq. 6)}$$

Thus, $$W = \alpha_T^\dagger = \alpha H_T^H (H_T H_T^H)^{-1} \quad \text{(Eq. 7)}$$

which requires that $H_T H_T^H$ is singular, so $$N_T \geq \sum_{i=1}^{K} N_i,$$

and where $\alpha$ is the transmit power normalization factor for each station (or user).

As will be understood, the Tx-ZF module 112 fully diagonalizes the matrix $H_T$, and accordingly the number of spatial streams for each station is the same as the corresponding number of receive antennas (i.e., $L_i = N_i$). Thus, in at least some embodiments in which an AP implements the steering vector controller 110, the stations do not support modulation and coding scheme (MCS) adaptation to a lower number of streams. In an extreme case, (e.g., a line of sight (LOS) channel or an ill-conditioned channel), more than one spatial stream may be broken in a communication link. Further, in at least some embodiments, the technique implemented by the steering vector controller 110 is associated with a less-than-optimal power efficiency. In other words, given the same power amplifier (PA) output power, a post-processing signal-to-noise ratio (SNR) at a receiving station may be low because a large portion of the transmit power is used for interference cancellation between stations (users) as well as between spatial streams.

Figure 3C:
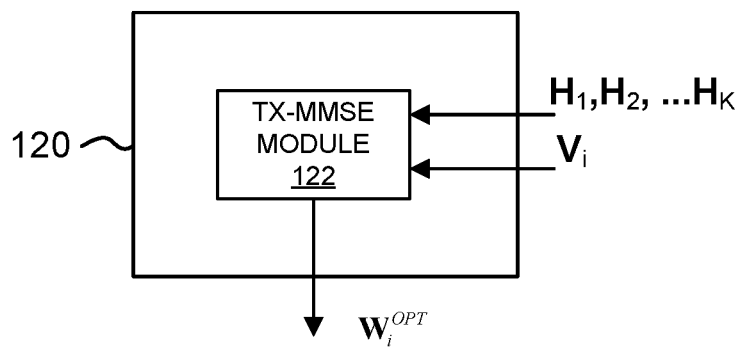
FIG. 3C is a block diagram of a steering vector controller that generates beamsteering vectors using a minimum mean square error (MMSE) technique, used in a DL SDMA controller according to an embodiment.

Now referring to FIG. 3C, a steering vector controller 120 includes a transmit minimum mean square error (Tx-MMSE) module 122. The Tx-MMSE module 122 receives channel descriptors $H_1$, $H_2$, ... $H_K$ and outputs corresponding steering vectors $W_i$, $W_2$, ... $W_K$. In an embodiment, the Tx-MMSE module 122 is generally similar to an MMSE receiver for harmonizing interference cancellation and noise enhancement. During operation, the Tx-MMSE module 122 generates steering vectors $W_i$, $W_2$, ... $W_K$ so as to minimize (or, at least, attempt to minimize) receiver input MSE at each receiving station (i.e., the receiver input signal before equalization that is unknown at the transmitting device). To this end, the Tx-MMSE module 112 implements the following design rule:

$$\{W_i^{opt}\} = \underset{\{W_i\}}{\arg\min} \sum_{i=1}^{K} MSE_i \quad \text{(Eq. 8)}$$

where $$MSE_i = E[\|y_i - H_i V_i x_i\|^2] \quad \text{(Eq. 9)}$$

and $V_i$ is any SU-BF steering matrix for a station i, e.g., $$V_i = \text{SVD}(H_i) \quad \text{(Eq. 10)}$$

In another embodiment, the vector $V_i$ is an unsteered spatial mapping matrix.

Using Eq. 8 and Eq. 9, the following derivation is possible:

$$MSE_i = E[\|y_i - H_i V_i x_i\|^2]$$

$$= E\left[\left(H_i(W_i - V_i)x_i + H_i \sum_{k \neq i} W_k x_k + n_i\right)^H\right.$$

$$\left.\left(H_i(W_i - V_i)x_i + H_i \sum_{k \neq i} W_k x_k + n_i\right)\right]$$

$$= Tr\left\{E\left[\left(H_i(W_i - V_i)x_i + H_i \sum_{k \neq i} W_k x_k + n_i\right)\right.\right.$$

$$\left.\left.\left(H_i(W_i - V_i)x_i + H_i \sum_{k \neq i} W_k x_k + n_i\right)^H\right]\right\}$$

$$= Tr\left\{H_i(W_i W_i^H - V_i W_i^H - W_i V_i^H + \|V_i\|^2)H_i^H + \right.$$

$$\left. H_i\left(\sum_{k \neq i} W_k W_k^H\right)H_i^H + N_0 I\right\}$$

For Tx MMSE, an attempt is made to minimize the following Lagrange formula:

$$f(\{W_i\}_{i=1...K}) = \sum_{i=1}^{K} MSE_i + \sum_{i=1}^{K} (Tr(W_i^H W_i) - P_i)$$

where $P_i$ is the transmit power for a station i. To achieve minimization using matrix differentiation rules, the following is obtained:

$$\frac{\partial f}{\partial W_i} = 2\left(\sum_{k=1}^{K} H_k^H H_k\right) W_i - 2H_i^H H_i V_i + 2W_i = 0$$

It then follows that:

$$W_i^{opt} = \alpha\left(\sum_{k=1}^{K} H_k^H H_k + I\right)^{-1} H_i^H H_i V_i, \quad \text{(Eq. 11)}$$

where $\alpha$ is the transmit power normalization factor. However, because this technique does not completely cancel interference, the channel dimensionality requirement in some embodiments is relaxed so that $$N_T \geq \sum_{i=1}^{K} L_i \quad \text{(Eq. 12)}$$

Thus, in an embodiment, the Tx-MMSE module 122 implements the design rule expressed by Eq. 8 using Eq. 11.

Figure 3D:
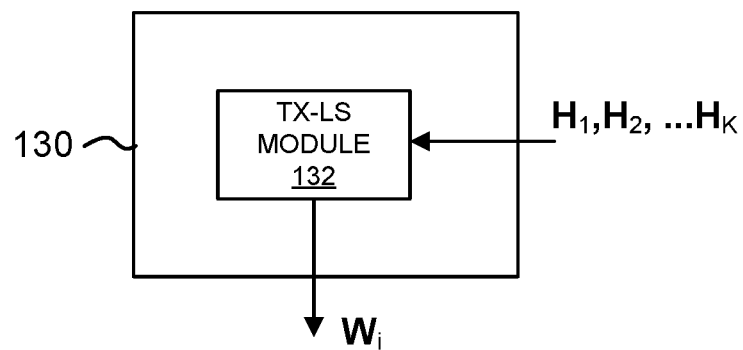
FIG. 3D is a block diagram of a steering vector controller that generates beamsteering vectors using a leakage suppression (LS) technique, used in a DL SDMA controller according to an embodiment.

Referring to FIG. 3D, a steering vector controller 130 includes a transmit leakage suppression (Tx-LS) module 132 that attempts to minimize the "leakage" of a transmitted signal to all stations for which the transmitted signal is not intended. In other words, the Tx-LS module 132 attempts to maximize the signal-to-leakage-plus-noise ratio (SLNR). To this end, the Tx-LS module 132 receives channel descriptors $H_1, H_2, \ldots H_K$ and implements the following design rule:

$$W_i^{opt} = \underset{W_i}{\operatorname{argmin}} \frac{Tr\{W_i^H(H_i^H H_i)W_i\}}{Tr\left\{W_i^H\left(N_0 N_R I + \sum_{k \neq i} H_k^H H_k\right)W_i\right\}} \quad \text{(Eq. 13)}$$

A technique that can be used to generate an implementation algorithm for the design rule expressed in Eq. 13 is described in Zhang et. al., "Asynchronous Interference Mitigation in Cooperative Base Station System," IEEE Transactions on Wireless Communications, Vol. 7, No. 1 (January 2008), incorporated by reference herein in its entirety. Using this technique, the following sub-optimal solution to the design rule in Eq. 13 is developed:

$$W_i = \alpha V_{SVD}\left(\left(N_0 N_R I + \sum_{k \neq i} H_k^H H_k\right)^{-1} (H_i^H H_i)\right) \quad \text{(Eq. 14)}$$

This sub-optimal solution maximizes the lower bound of the criteria in Eq. 13

Figure 3E:
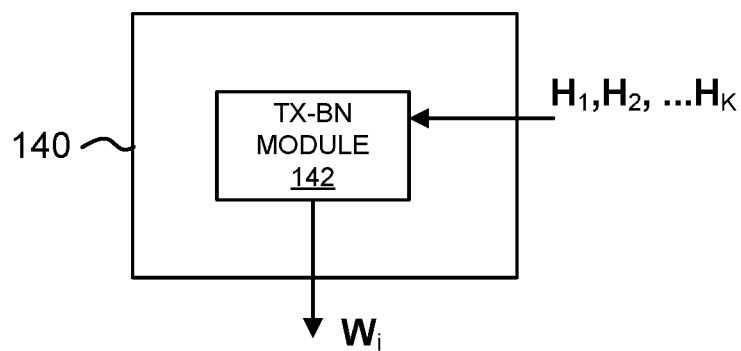
FIG. 3E is a block diagram of a steering vector controller that generates beamsteering vectors using a block nullification (BN) technique, used in an DL SDMA controller according to an embodiment.

Now referring to FIG. 3E, a steering vector controller 140 includes a transmit block nullification (Tx-BN) module 142. The Tx-BN module 142 receives channel descriptors $H_1, H_2, \ldots H_K$ and outputs corresponding steering vectors $W_1, W_2, \ldots W_K$. In an embodiment, the Tx-BN module 142 designs the steering vectors $W_1, W_2, \ldots W_K$ so as to block-diagonalize $H_W$, i.e. cancel interference between different stations, but not cancel interference between different spatial streams at each station. Thus, according to this embodiment, the product of the aggregate channel matrix $H_T$ and an aggregate steering vector W can be expressed as $$H_W = \begin{bmatrix} H_1 W_1 & 0 & \cdots & 0 \\ 0 & H_2 W_2 & \cdots & 0 \\ \vdots & \vdots & \vdots & \vdots \\ 0 & 0 & \cdots & H_K W_K \end{bmatrix} \quad \text{(Eq. 15)}$$

Thus, $H_k W_i = 0$, $k \neq i$. In other words, the steering matrix $W_i$ of a station i has to project to the null-space of the space spanned by the channels for all the other users. Therefore, $$N_T - \operatorname{rank}(H_{\bar{T}}) \geq L_i \quad \text{(Eq. 16)}$$

and $$N_T > \operatorname{rank}(H_{\bar{T}}), \forall i \quad \text{(Eq. 17)}$$

where $H_{\bar{T}}$ is the sub-matrix of $H_T$ that excludes the rows in $H_i$.

According to an embodiment, the steering matrix $W_i$ is developed using a direct projection to null-space of $H_{\bar{T}}$:

$$W_i = \alpha(I - H_{\bar{i}}^{\dagger} H_{\bar{i}}) \quad \text{(Eq. 18)}$$

where $H_{\bar{T}}^{\forall}$ is pseudo-inverse of $H_{\bar{T}}$:

$$H_{\bar{i}}^{\dagger} = H_{\bar{i}}^H (H_{\bar{i}} H_{\bar{i}}^H)^{-1}. \quad \text{(Eq. 19)}$$

According to another embodiment, the steering matrix $W_i$ is developed using an SVD approach by taking the singular vectors corresponding to the zero singular values of $H_{\bar{T}}$:

$$H_{\bar{i}} = U_{\bar{i}} \begin{bmatrix} \sigma_1 & & & \\ & \ddots & & \\ & & \sigma_M & \\ & & & 0 \end{bmatrix} V_{\bar{i}}, \quad W_i = \alpha V_{\bar{i}}(0). \quad \text{(Eq. 20)}$$

Figure 4:
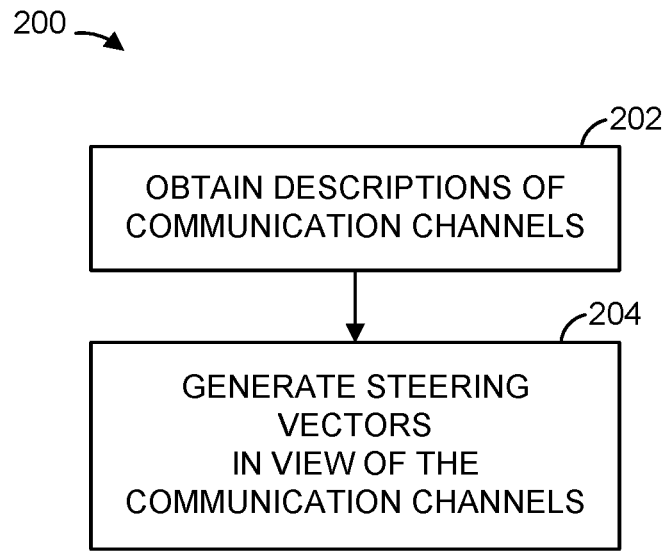
FIG. 4 is a flow diagram of an example method for generating steering vectors for use in DL SDMA transmissions, according to an embodiment.

Referring to FIG. 4, a method 200 for developing steering vectors for simultaneous transmission of data to two or more stations. The DL SDMA controller 19 or the DL SDMA controller 50, for example, are configured to implement the method 200, according to some embodiments. At block 202, descriptions of two or more communication channels are obtained by developing CSI metrics at the AP or using CSI feedback, for example. In an embodiment, the channel estimation unit 62 executes block 204 at least partially, and implements any suitable technique including those discussed above (e.g., zero-forcing, leakage suppression, block nullification, minimizing MSE).

Next, at block 204, several steering vectors are concurrently generated in view of multiple channel descriptions. In an example scenario, three steering vectors for use with three receiving stations are concurrently generated in view of the three channel descriptions corresponding to the three channels via which data is simultaneously transmitted to the stations. According to an embodiment, block 204 is implemented by the steering vector controller 60.

Figure 5:
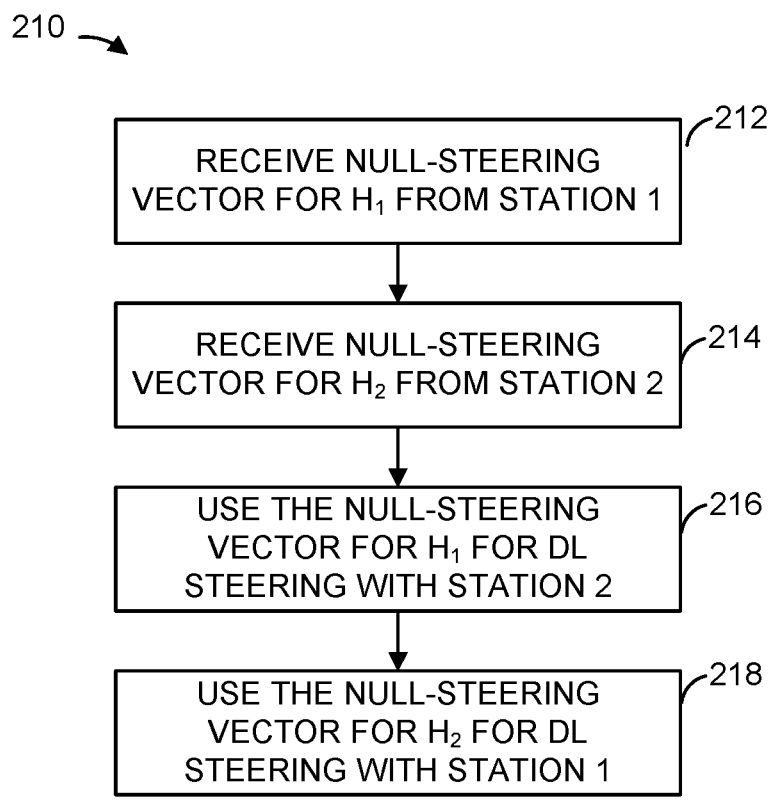
FIG. 5 is a flow diagram of an example method for generating a pair of steering vectors for use with two stations operating in an SDMA mode, according to an embodiment.

FIG. 5 is a flow diagram of an example method 210 that an AP implements to generate a pair of transmit steering vectors for simultaneous transmission of data to a corresponding pair of stations, according to an embodiment. The method 210 yields steering vectors that form an aggregate steering vector similar to a block-nullified aggregate steering vector, for example. The DL SDMA controller 19 or the DL SDMA controller 50, for example, is configured to implement the method 210, according to some embodiments.

At block 212, an indication (e.g., mathematical description) of a first null-steering vector for a communication channel between the AP and the first station is received. The first null-steering vector corresponds to a null-space projection of the first communication channel. In other words, for a communication channel described by $H_1$, the first null-steering vector is a vector that the AP can apply to completely or nearly completely attenuate a signal a station will receive via the communication channel described by $H_1$. Next, at block 214, an indication of a second null-steering vector for a communication channel between the AP and the second station is received. Similar to the first null-steering vector, the second null-steering vector is a vector that the AP can apply to completely or nearly completely attenuate a signal a station will receive via the communication channel described by $H_2$.

At blocks 216 and 218, steering vectors for use in simultaneous downlink transmissions to the first station and the second station are generated using the first null-steering vector and the second null-steering vector. In particular, the steering vector $W_1$ for use with the first station and the channel described by $H_1$ is assigned the value of the second null-steering vector, and the steering vector $W_2$ for use with the second station and the channel described by $H_2$ is assigned the value of the first null-steering vector. In this manner, a pair of transmit steering vectors $W_1$ and $W_2$ is developed for simultaneous transmission of data to the first and second stations.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a communication network, the method comprising:
    obtaining, at a first communication device, respective channel estimate information for respective multiple input multiple output (MIMO) communication channels between i) the first communication device and ii) at least three respective second communication devices;
    generating, at the first communication device, respective steering matrices for use in communicating with the respective second communication devices, wherein generating each respective steering matrix for use in communicating with each respective second communication device comprises
        generating, at the first communication device, a respective aggregate channel matrix that i) includes channel estimate matrices for multiple others of the second communication devices, and ii) omits the channel estimate matrix for the respective second communication device, and
        calculating, at the first communication device, the respective steering matrix with the respective aggregate channel matrix to project to a null-space of a space spanned by the respective aggregate channel matrix; and
    utilizing, at the first communication device, the respective steering matrices to simultaneously transmit respective signals to the respective second communication devices.

2. The method of claim 1, wherein obtaining the respective channel estimate information comprises:
    receiving, at the first communication device, the respective channel estimate information from the multiple second communication devices.

3. An apparatus, comprising:
    a network interface associated with a first communication device, the network interface comprising:
        one or more integrated circuit (IC) devices,
        a plurality of transceivers implemented using the one or more IC devices, and
        zero forcing circuitry implemented on the one or more IC devices;

wherein the one or more IC devices are configured to:
obtain respective channel estimate information for respective multiple input multiple output (MIMO) communication channels between i) the first communication device and ii) at least three respective second communication devices;
generate respective aggregate channel matrices corresponding to the respective second communication devices, wherein each respective aggregate channel matrix i) includes channel estimate matrices for multiple others of the second communication devices, and ii) omits the channel estimate matrix for the respective second communication device;
generate respective steering matrices for use in communicating with the respective second communication devices, including calculating each respective steering matrix with the respective aggregate channel matrix to project to a null-space of a space spanned by the respective aggregate channel matrix; and
utilize the respective steering matrices while the first communication device simultaneously transmits respective signals to the respective second communication devices.

4. The apparatus of claim 3, wherein the one or more IC devices are configured to receive the respective channel estimate information from the multiple second communication devices.

5. The apparatus of claim 3, wherein:
the network interface includes i) a processor implemented on the one or more IC devices and ii) a memory coupled to the processor, the memory implemented on the one or more IC devices;
the processor is configured to execute machine readable instructions stored in the memory;
the machine readable instructions stored in the memory include instructions that, when executed by the processor, cause the processor to generate the respective steering matrices.

6. The apparatus of claim 3, wherein the network interface comprises hardware circuitry on the one or more IC devices that is configured to generate the respective steering matrices.

7. The apparatus of claim 3, further comprising:
a plurality of antennas coupled to the plurality of transceivers.

8. The apparatus of claim 3, wherein:
the network interface device further includes:
a media access control (MAC) unit implemented on the one or more IC devices, and
a physical layer (PHY) unit coupled to the MAC unit, wherein the PHY unit is implemented using the one or more IC devices;
the PHY unit includes a spatial-division multiple access (SDMA) controller implemented using the one or more IC devices; and
the SDMA controller is configured to generate the respective steering matrices.

9. A tangible, non-transitory computer readable medium storing machine-readable instructions that, when executed by one or more processors, cause the one or more processors to:
obtain respective channel estimate information for respective multiple input multiple output (MIMO) communication channels between i) the first communication device and ii) at least three respective second communication devices;
generate respective aggregate channel matrices corresponding to the respective second communication devices, wherein each respective aggregate channel matrix i) includes channel estimate matrices for multiple others of the second communication devices, and ii) omits the channel estimate matrix for the respective second communication device;
generate respective steering matrices for use in communicating with the respective second communication devices, wherein generating each respective steering matrix for use in communicating with each respective second communication device comprises calculating each respective steering matrix with the respective aggregate channel matrix to project to a null-space of a space spanned by the respective aggregate channel matrix; and
utilize the respective steering matrices to simultaneously transmit respective signals to the respective second communication devices.

10. The computer readable medium of claim 9, wherein the respective channel estimate information are received from the multiple second communication devices.

11. A system, comprising:
a first communication device having a first network interface, the first network interface including:
one or more first integrated circuit (IC) devices,
a plurality of first transceivers implemented using the one or more first IC devices,
a plurality of first antennas coupled to the plurality of first transceivers, and
zero forcing circuitry implemented on the one or more first IC devices;
wherein the one or more IC devices are configured to:
obtain respective channel estimate information for respective multiple input multiple output (MIMO) communication channels between i) the first communication device and ii) at least three respective second communication devices;
generate respective aggregate channel matrices corresponding to the respective second communication devices, wherein each respective aggregate channel matrix i) includes channel estimate matrices for multiple others of the second communication devices, and ii) omits the channel estimate matrix for the respective second communication device;
generate respective steering matrices for use in communicating with the respective second communication devices, wherein generating each steering matrix comprises calculating each respective steering matrix with the respective aggregate channel matrix to project to a null-space of a space spanned by the respective aggregate channel matrix; and
utilize the respective steering matrices while the first communication device simultaneously transmits respective signals to the respective second communication devices;
wherein the system further comprises the at least three second communication devices, wherein each second communication device includes:
a second network interface including one or more second IC devices, and
a set of one or more second antennas coupled to the second network interface.

12. The system of claim 11, wherein the one or more second IC devices of each second communication device are configured to transmit the respective channel estimate information to the first communication device.

13. The system of claim 11, wherein:
the first network interface includes i) a processor implemented on the one or more first IC devices and ii) a memory coupled to the processor, the memory implemented on the one or more first IC devices;
the processor is configured to execute machine readable instructions stored in the memory;
the machine readable instructions stored in the memory include instructions that, when executed by the processor, cause the processor to generate the respective steering matrices.

14. The system of claim 11, wherein the first network interface comprises hardware circuitry on the one or more first IC devices configured to generate the respective steering matrices.

15. The method of claim 1, wherein generating each steering matrix for each respective second communication device comprises:

determining, at the first communication device, a respective direct projection onto a respective null space of the respective aggregate channel matrix.

16. The apparatus of claim 3, wherein the one or more IC devices are configured to:
determine a respective direct projection onto a respective null space of the respective aggregate channel matrix.

17. The computer readable medium of claim 9, further storing machine-readable instructions that, when executed by the one or more processors, cause the one or more processors to:
determine a respective direct projection onto a respective null space of the respective aggregate channel matrix.

18. The system of claim 11, wherein the one or more first IC devices of the first network interface are configured to determine a respective direct projection onto a respective null space of the respective aggregate channel matrix.

* * * * *